United States Patent [19]

Pynnönen

[11] 4,317,721
[45] Mar. 2, 1982

[54] INSIDE FLOW FILTER

[76] Inventor: Pentti Pynnönen, 19650 Joutsa, Finland

[21] Appl. No.: 167,144

[22] Filed: Jul. 9, 1980

Related U.S. Application Data

[63] Continuation of Ser. No. 33,519, Apr. 26, 1979, abandoned.

[30] Foreign Application Priority Data

Apr. 27, 1978 [FI] Finland .................................. 781311

[51] Int. Cl.³ ............................................. B01D 35/00
[52] U.S. Cl. .................................... 210/120; 210/136; 210/205; 210/263; 210/323.2
[58] Field of Search ............... 210/120, 136, 205, 263, 210/323.2

[56] References Cited

U.S. PATENT DOCUMENTS

| | | | |
|---|---|---|---|
| 2,890,838 | 6/1959 | Janssen | 210/278 X |
| 3,662,780 | 5/1972 | Marsh | 210/191 X |
| 3,779,281 | 12/1973 | Brane | 210/171 X |
| 3,814,245 | 6/1974 | Hirs | 210/279 X |
| 4,065,388 | 12/1977 | Flynn et al. | 210/279 X |

*Primary Examiner*—William F. Smith
*Assistant Examiner*—Ferris H. Lander
*Attorney, Agent, or Firm*—Martin Smolowitz

[57] ABSTRACT

Continuously operating inside flow filter for placement within a pressure tank, comprising one or several filter cartridges filled with a filtering mass and an alkalizing mass placed around a sludge cylinder fitted upon a bottom grating, and the pipe system associated with the equipment, with valve control. Both the water filtering and the flushing have been arranged to take place by operating one single three-way valve known in itself, in such manner that during filtration this valve and the drain valve in the bottom of the tank is closed and the water flows from the water mains through the three-way valve and a check valve and through a pipe into the lower part of the tank in among the mass, whereby the iron will be precipitated. During use of water the water flows under effect of pressure through the finely divided mass in the filter cartridge, the iron becoming thereby adherent to its surface layers, while for accomplishing the flushing the water pump is kept switched off and the water mains valve is kept closed and the drain valve opened, whereby as the three-way valve is opened and when the pump has started, the iron precipitated during the counter-flow flushing will flow through the top of the filter cartridge and into the sludge cylinder in the lower part of the pressure tank.

1 Claim, 1 Drawing Figure

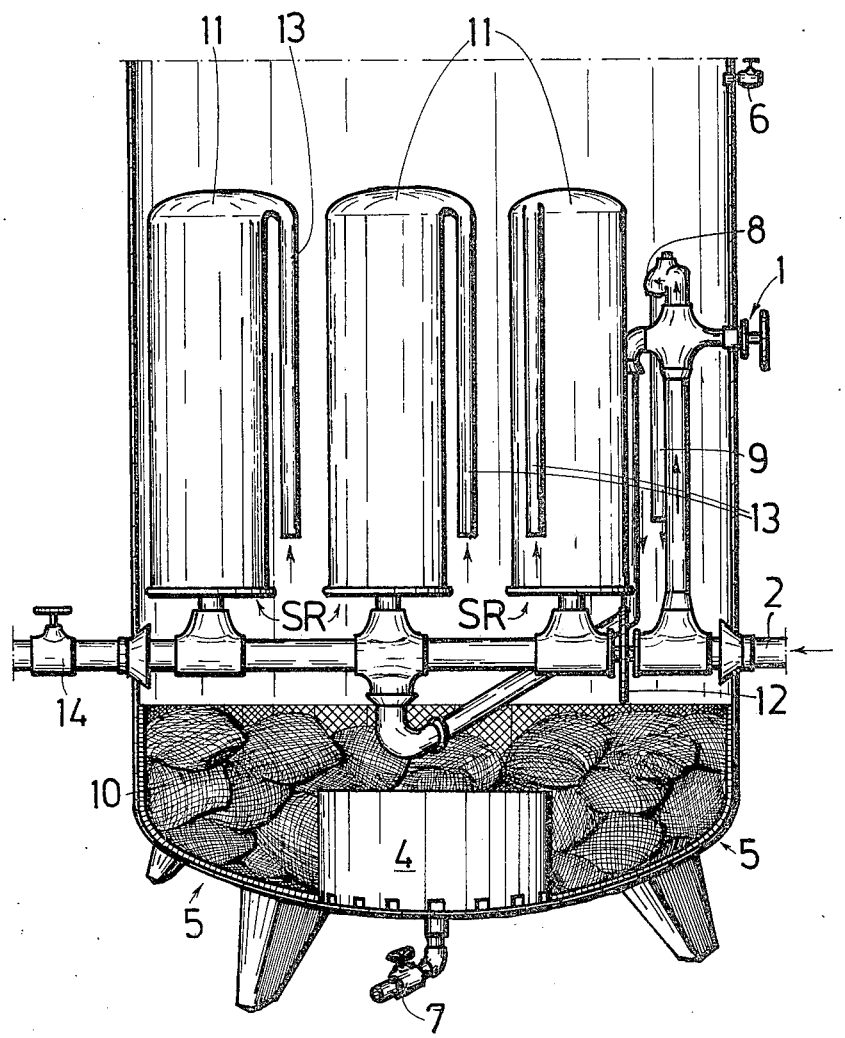

INSIDE FLOW FILTER

This is a continuation of application Ser. No. 33,519 filed Apr. 26, 1979, and now abandoned.

The present invention concerns a continuously operating inside flow filter for placement in a pressure tank and comprising one or several filter cartridges filled with filter mass, and an alkalising mass placed around a sludge cylinder fitted upon a bottom grating, and the piping associated with the equipment, with valve control.

The inside flow filter method is intended for use in the purifying of the service water of small households from iron, carbonic acid, manganese etc. flavour and adour nuances and impurities which are encountered in abundance in our drinking and service waters.

No such competent, low-priced and continuously acting pressure filter has been developed which could be mounted inside the pressure tank of a pressurised water installation already in operation.

The inside flow filter of the invention is characterized in that the water filtering and the flushing have both been arranged to take place by using place by using one single three-way valve, known in itself, in such manner that during filtration this valve and the draining valve in the bottom of the tank are closed and the water flows from the water mains through the three-way valve and a check valve and through a pipe the lower part of the tank, in among the mass, whereby the iron will be precipitated and as water is being drawn the water will under effect of pressure flow through the finely divided mass in the filter cartridge, the iron adhering then to its surface layers, while for accomplishing the flushing the water pump is kept switched off and the valve of the mains is kept closed and the drain valve opened, whereby when the three-way valve is opened and after the pump has started the iron precipitated during counter-current flushing will flow through the top of the filter cartridge into the sludge cylinder in the lower part of the pressure tank.

The invention is described in the following with the aid of an example, with reference being made to the attached drawing.

The inner thread nut of the packing ring on the neck body of the three-way valve is taken off, as well as the turning cap of the valve, whereupon the neck body of the valve is screwed into the water gauge attachment aperture. From the outside, a reducing socket is screwed on, to clamp the packing ring of the valve stem.

Prior to screwing the three-way valve fast to the tank, a pipe bend is screwed thereon, comprising a check valve, to which is screwed another pipe bend and to this latter a pipe pointing towards the bottom of the tank, preventing the flow of air and water to the pump.

To the 90° angle of the side outlet on the three-way valve there is screwed a 90° pipe bend. To the water inlet port on the lower leg of the valve a plastic connector is screwed, and a plastic pipe length. The three-way valve is screwed into the tank in the manner already described.

Next, a filter cartridge frame assembled of tees and crosspipes and pipe lengths is made up, having on its ends rubber cones which engage positively with the edges of the tank's intake and exit ports below the filter cartridge frame with the aid of the tightening member 12. Next, the plastic containers are screwed on, which are filled with filtering mass or with quartz sand. The SR covers under the filter cartridges have been provided with threaded packing rings. In the centre of the covers, metal tubes have been soldered to the plastic and which have been perforated on a length of 50 mm within the plastic container and have been protected with a nylon fabric well permeable to water. Plastic tubes 13 depart from the upper part of the plastic container with a view to preventing the escape of compressed air from the top part of the container.

The draining valve is next screwed into the bottom of the pressure tank. On the bottom of the pressure vessel in the central part is placed a cylinder 4, which has a serrated lower margin. The cylinder consists of hard plastic, which promotes the running to the drain valve of such precipitate that has accumulated in retrograde flushing and otherwise. The plastic gratings 5 are installed next. On the bottom of the gratings and the tank around the cylinder there is placed, for instance, alkalising Aktolit compound used in iron elimination, this compound having been packed in net bags, in batches of about 2-3 kg. The bags are piled upon each other, ascending from the cylinder towards the walls. The quantity of mass is about 80 to 100 kg or more, depending on how much iron the water contains. The top ends of the gratings are left open with a view to faster alkalisation of the water, as flow is taking place under the mass as well.

The inside flow filtration is accomplished in that the three-way valve is turned tightly into its normal closed position, and one makes sure that the bottom drain valve is closed, and the water mains valve is opened. The water will then flow straight through the three-way and check valves in between the mass in the lower part of the tank, whereby the iron present in the water is precipitated and runs into the cylinder on the bottom of the tank if the water stands any longer time in the tank.

During such times when water is being used, the water flows by effect of pressure through the finely divided mass, the quartz sand, in the filter cartridges, whereby the precipitated iron accumulates in the surface layers of the sand.

Flushing of the filter cartridges is undertaken about once every month. The water pump is first switched off, the water mains valve is opened, the bottom valve of the tank is opened and the three-way valve is turned into its open position, or into the half-open position depending on the water lifting capacity of the pump, to make sure that the quartz sand is not flushed out from the cartridges by effect of counterpressure. The pump is started to run 2 or 3 minutes, whereby the iron precipitated during counter-current flushing will flow through the tops of the filter cartridges into the cylinder in the lower part of the pressure tank. The topmost water gauge plug of the pressure tank or the venting valve 6 mounted there, is opened for faster water flow and to admix it.

After the pressure tank has been emptied, the three-way valve is slowly turned tightly into the closed position and the venting valve 6 is closed at the same time. Water is pumped into the tank. As soon as the water has cleared up, about 1-2 minutes later, the drain valve 7 is closed.

Upon filling of the tank to normal working pressure, the valve 14 communicating with the water mains is opened.

If the water has a very high content of iron and carbonic acid, then the Aktolit net bags may be taken out in connection with the flushing and placed in water, where they may be pounded and agitated with several changes of water. This operation is carried out about once every year. The filter cartridges and Aktolit masses will have to be replaced and renewed every two or three years.

I claim:

1. A water filtering apparatus, which comprises:
  (a) a pressure tank having an inlet port for water having impurities and outlet port for filtered water;
  (b) a water pump attached on the inlet side of said tank for pressurized water;
  (c) a check valve mounted at bottom of the pressure tank to prevent a flow of air and water to the pump;
  (d) a three-way valve mounted securely inside the tank such that a neck body of the valve is being engaged with a water gauge attachment aperture inside the tank and said three-way valve is in communication with the check valve;
  (e) a filter cartridge frame assembled of tees and crosspipes having end rubber cones which engage securely with the intake and outlet ports of the tank below the filter cartridge frame, said engagement is being secured with a tightening member at each of said rubber cones.
  (f) a draining valve mounted into the bottom of the tank;
  (g) a sludge cylinder made of hard plastic fitted upon a bottom grating of the tank and said cylinder is being positioned in a central part of the tank in communication with the draining valve to promote the running to the draining valve of such precipitate that has accumulated in retrograde flushing;
  (h) a plurality of bags having an alkaline mass placed around the sludge cylinder and said bags ascending from the cylinder to walls of the tank for alkalisation of the water to be filtered; and
  (i) a venting valve mounted at the top of the tank for admitting air to activate the water flow inside the tank.

* * * * *